Oct. 22, 1940.  G. A. WOODMAN  2,219,001

SPRING DEVICE

Filed March 16, 1939

INVENTOR.
George A. Woodman, deceased.
By Marshall Woodman Tufts, Executor
BY Bell, Wallace and Cannon
ATTORNEYS.

Patented Oct. 22, 1940

2,219,001

UNITED STATES PATENT OFFICE 2,219,001

SPRING DEVICE

George A. Woodman, deceased, late of Chicago, Ill., by Marshall Woodman Tufts, executor, Chicago, Ill.

Application March 16, 1939, Serial No. 262,244

9 Claims. (Cl. 267—9)

The invention relates generally to spring devices and more particularly to friction governed spring devices of the general type employed in railway car bolsters and draft gear.

The primary object of the present invention is to provide such a friction governed spring device of new, improved and simplified construction.

A further object is to provide such a friction governed spring device wherein the governing frictional contact is induced by a plurality of individual spring elements which are so mounted and related as to equalize the resilient force on the friction shoes in a novel and improved manner.

Another object is to provide such a friction governed spring device wherein leaf or bow springs used to produce the required reaction between the friction shoes are so mounted and related to the other parts of the device as to simplify the wearing parts as well as the repair and assembly of the device.

Other objects and advantages will become apparent from the following description, taken in connection with the accompanying drawing in which.

Figure 1:
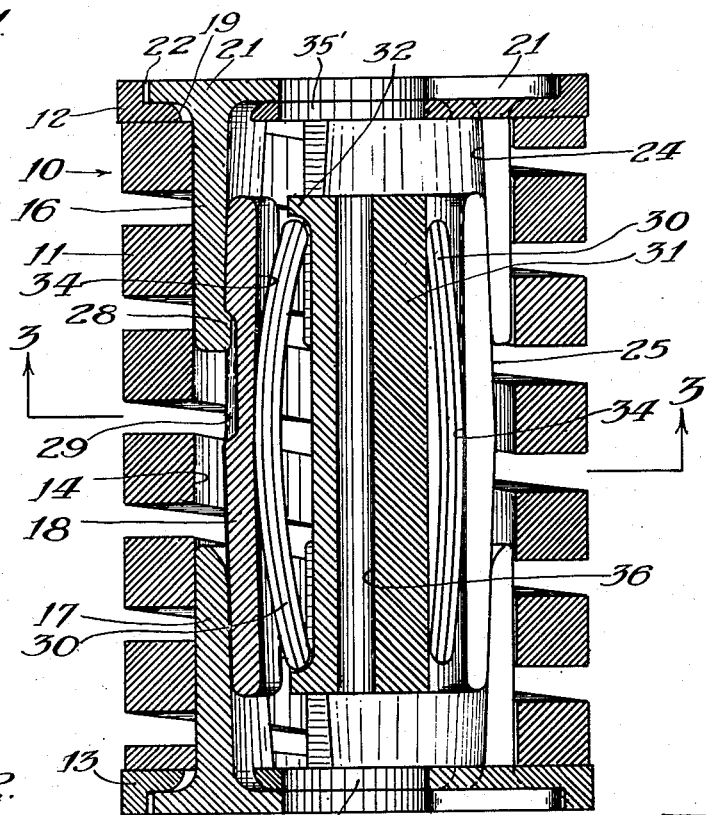
Fig. 1 is a central longitudinal sectional view of a friction governed spring device embodying the features of the invention.

In the form chosen for disclosure herein the invention is embodied in a friction governed spring device 10, adapted particularly for use in a car bolter, and comprising an outer or main spring barrel 11 of the coil spring type having duplicate upper and lower end seats or plates 12 and 13 and an internal friction mechanism operable to retard the compression as well as the return or expansion movement of the spring 11.

The spring barrel 11 is preferably formed from a bar of square cross section with the ends of the coiled bar tapered to provide flat ends for engagement with the spring seats 12 and 13. The spring 11 is formed to provide a cylindrical inner surface 14 for cooperation with the friction mechanism of the device. The end plates 12 and 13, as above mentioned, are of similar form and are so constructed as to aid in positioning the elements of the friction mechanism.

Figure 2:
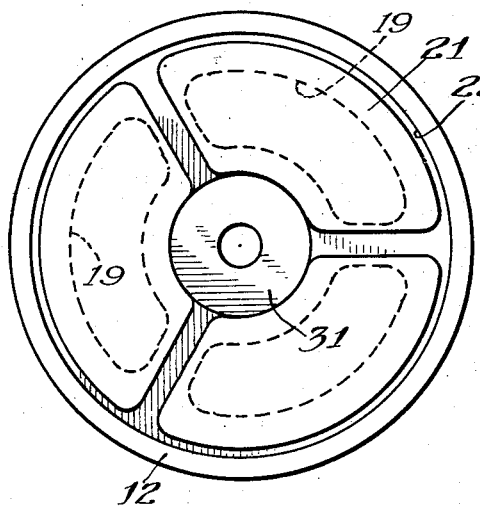
Fig. 2 is a top plan view of the device of Fig. 1.

This friction mechanism as herein shown has three duplicate sets of cooperating friction elements, each set comprising upper and lower outer friction shoes 16 and 17, and an inner friction shoe 18. When three sets of friction elements are employed, the end plates 12 and 13 are formed with three equally spaced sector-like openings 19 therein as shown in dotted outline in Fig. 2, so that the outer friction shoes 16 may extend through the upper end plate 12 and the outer friction shoes 17 through the lower end plate 13. Thus the arcuate outer faces 20 of the shoes 16 and 17 are positioned within the spring 11 in opposed relation to the cylindrical inner surface 14 of the spring 11. The shoes 16 and 17 are maintained in the desired lateral relation to each other by engagement of their side edges with the openings 19 in the end plates, while sector-like end flanges 21 on the outer ends of the shoes 16 and 17 rest loosely in a circular recess 22 formed in the end plates so as to limit inwise inward displacement of the shoes 16 and 17 relative to the end plates.

The outer friction shoes 16 and 17 are of substantially the same length and are so proportioned that their adjacent ends are normally separated, as shown in Fig. 1, when the spring 11 is in its normal or extended relation. The amount of this separation is preferably sufficient to allow complete compression of the spring 11. As a result of this proportioning the space between the ends of the upper and lower shoes 16 and 17 is located midway between the ends of the spring 11, and the associated inner friction shoe 18 of each set is so disposed as to span this space and bear on the inner surfaces of the upper and lower shoes. The operative frictional area or surface of the inner and outer shoes is relatively great as will be evident in Figs. 1 and 3. Thus the outer shoes 16 and 17 have inner friction faces 24 of arcuate horizontal cross section, while each inner shoe 18 has a complemental outer arcuate friction face 25.

The friction faces 24 and 25 are preferably arranged so that when the spring 11 is compressed there is a wedging action tending to cause greater frictional contact between the friction faces 20 of the outer shoes and the spring 11, and between the engaged friction faces of the inner and outer shoes. This end is attained in the present instance by tapering the friction surfaces 24 of the outer shoes outwardly toward the adjacent ends of the shoes 16 and 17, and by correspondingly tapering the friction face 25 inwardly towards the opposite ends of the shoe 18.

Means is provided to normally support the inner friction shoes 18 in a median vertical position so as to insure uniformity of coaction between the inner shoes and their associated upper and lower shoes 16 and 17. In the present instance this means comprises a limited lost motion connection between each inner shoe 18 and its associated upper shoe 16. This lost motion connection is preferably formed by a lug 28 formed centrally of the lower edge of each upper shoe 16 and projecting inwardly into a vertical slot 29 formed in the outer face 25 of the shoe 18.

The friction shoes 16, 17 and 18 are urged into operative frictional contact with each other and with the spring 11 by yielding means housed within the spring 11, and in accordance with the present invention this means is so constructed and mounted as to simplify manufacture of the several friction shoes, and in addition, this means is such as to be separate from the wearing parts of the device. Thus each set of friction shoes has its own tensioning spring 30 which is preferably of the leaf or bow spring type, and these separate springs 30 are so mounted and related as to equalize the action of the several sets of friction shoes. To this end a single mounting member 31 in the form of an elongated spindle is provided, and the springs 30 are initially tensioned in their mounting on the member 30. Thus the spindle 31 is of generally triangular cross section throughout the major portion of its length while at each end it has a disk-like end or head 32. The heads 32, therefore, form abutment flanges or shoulders at each end of each of the three flat sides 33 of the spindle. The springs 30 may be initially tensioned by placing each spring with its ends in abutting relation to the shoulders on side face 33, or if desired, may be relatively loose in their mounting and dependent upon the wedging action to provide tension as required. Hence the springs 30 bow outwardly from the faces 33, and by proper proportioning of the lengths of the spindle and the springs, the springs 30 are made to exert the desired initial outward pressure on the inner faces 34 of the inner shoes 18.

Figure 3:
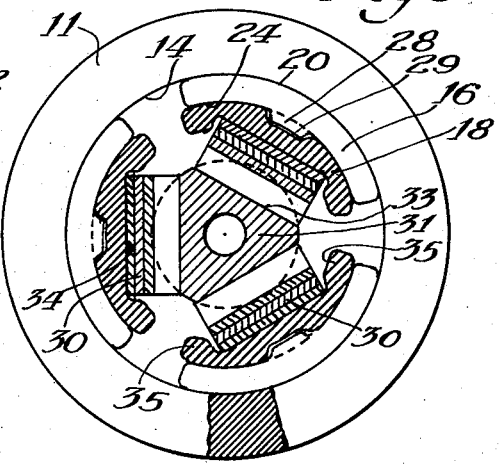
Fig. 3 is a sectional view taken along the line 3—3 of Fig. 1 and looking upwardly as indicated by the arrows in Fig. 1.

As shown in Fig. 3, means is provided to insure proper rotative positioning of the spring assembly with relation to the friction shoes, and this end is preferably attained through the provision of inwardly extending side ribs or flanges 35 along opposite sides of each of the inner shoes 18. Means is also provided to insure proper longitudinal positioning of the spring assembly, and in the present instance this end is attained by sloping the inner face 34 of each shoe 18 toward the midpoint of the shoe, as shown in Fig. 1. Thus the curved outer surface of the associated spring 30 cooperates with sloping surface 34 to maintain the spring assembly in the desired position wherein it applies its outward yielding force on the midpoint of each shoe 18.

In accordance with usual practice, central or axial bores 35' and 36 may be provided in the end plates 12 and 13, and the spindle 31 so as to permit the use of a loosely fitted central tie rod or bolt when required.

In the use of the present shock absorber the compressive forces are applied to the end plates 12 and 13 and the exposed faces of the flanges 21 of the outer friction shoes, so that compression of the spring 11 causes a corresponding approaching movement of the shoes 16 and 17. Such movement of the shoes 16 and 17 is resisted by the frictional engagement of the outer shoes with the internal surface 14 of the spring barrel, as well as by the frictional engagement of the outer shoes with the inner shoe 18.

As the compression of the spring increases this frictional resistance becomes greater due to the tapered arrangement of the engaged friction faces of the inner and outer shoes and the resulting compression of the tensioning springs 30. This frictional engagement of the several friction surfaces acts to dampen and control both the compression and expansion of the spring 11.

What is claimed is:

1. In a spring device of the character described, a spring barrel, end plates positioned on opposite ends of said spring barrel, a plurality of circumferentially spaced sets of friction shoes, each set comprising a pair of outer shoes each engaging the inner surface of the spring barrel adjacent opposite ends thereof and an inner shoe engaging the inner surfaces of both of said outer shoes, and means urging all of said inner shoes radially outwardly against said outer shoes.

2. In a friction controlled spring device of the character described, a spring barrel, end plates positioned on opposite ends of said spring barrel, a plurality of sets of friction shoes, each set comprising a pair of outer shoes engaging the inner surface of said spring barrel adjacent opposite ends thereof and an inner shoe engaging the inner faces of both of the outer shoes of the set, said inner and outer shoes having a wedging engagement with each other tending to retard endwise approaching movement of the outer shoes, means operable to locate the inner shoe of its set in a median relation to the outer shoes of its set, spring means operable to urge said inner shoes outwardly into contact with said outer shoes, and means on said inner shoes operable to position said spring means both rotatively and longitudinally with respect to said spring barrel.

3. A spring device of the character described comprising in combination, a spring barrel, end plates positioned on opposite ends of said spring barrel, a plurality of sets of friction shoes, each set comprising a pair of outer shoes engaging the inner surface of the spring barrel adjacent to opposite ends thereof and an inner shoe engaging the inner surfaces of both the outer shoes of the set, said inner and outer shoes being formed on their engaging surfaces to develop a wedging action as the spring barrel is compressed to resist such compression, and a spring assembly for urging said inner shoes radially outwardly comprising a plurality of bow springs and a central mounting spindle upon which said springs are mounted so as to bow outwardly therefrom to engage the central inner surfaces of said inner shoes.

4. A spring buffer of the character described comprising in combination, a spring barrel, end plates on opposite ends thereof, a plurality of sets of friction shoes, said sets each comprising an outer shoe engaging the inner surface of the spring barrel and an inner shoe engaging the inner surface of the outer shoe, said shoes of each set having a wedging relationship tending to resist relative endwise movement thereof during compression of said spring barrel, and means urging said inner shoes radially outwardly comprising a spring assembly having a plurality of bow springs and a central mounting member upon which said springs are carried so as to bow outwardly therefrom into engagement with the central inner surface of said inner shoes.

5. A spring device of the character described comprising in combination, a spring barrel, end plates positioned on opposite ends of said spring barrel, a plurality of sets of friction shoes, each set comprising a pair of outer shoes engaging the inner surface of the spring barrel adjacent to opposite ends thereof and an inner shoe engaging the inner surfaces of both the outer shoes of the set, said inner and outer shoes being formed on their engaging surfaces to develop a wedging action as the spring barrel is compressed to resist such compression, and a spring assembly for urging said inner shoes radially outwardly comprising a plurality of bow springs and a central mounting spindle upon which said springs are mounted so as to bow outwardly therefrom to engage the central inner surfaces of said inner shoes, said mounting spindle having shoulders engaging the ends of said bow springs to maintain said bow springs under compression.

6. A spring buffer of the character described comprising in combination, a spring barrel, end plates on opposite ends thereof, a plurality of sets of friction shoes, said sets each comprising an outer shoe positioned rotatively and longitudinally by one of said end plates and engaging the inner surface of the spring barrel and an inner shoe positioned rotatively by its outer shoe and engaging the inner surface of said outer shoe, said shoes of each set having a wedging relationship tending to resist relative endwise movement thereof during compression of said spring barrel, and means urging said inner shoes radially outwardly positioned and supported by said inner shoes.

7. A spring device of the character described comprising in combination, a spring barrel, end plates positioned on opposite ends of said spring barrel, a plurality of sets of friction shoes, each set comprising a pair of outer shoes engaging the inner surface of the spring barrel adjacent to opposite ends thereof and an inner shoe engaging the inner surfaces of both the outer shoes of the set, said inner and outer shoes being formed on their engaging surfaces to develop a wedging action as the spring barrel is compressed to resist such compression and tending to center said inner shoes longitudinal of said spring barrel, and a spring assembly for urging said inner shoes radially outwardly comprising a plurality of bow springs and a central mounting spindle having end flanges between which the ends of are tensioned said springs so as to bow outwardly therefrom to engage the central inner surfaces of said inner shoes, said inner shoes having said central inner surfaces formed to interlock with the bowed central portions of said bow springs to support said spring assembly.

8. In a spring device of the character described, a spring barrel, a plurality of sets of friction shoes extending within the spring barrel, each set comprising a pair of opposed outer shoes spaced from each other longitudinally of the axis of the spring barrel and an inner shoe engaging the inner surfaces of both of said outer shoes, and means urging all of said inner shoes radially outwardly against said outer shoes to cause the latter to have constant yielding frictional engagement with the inner surface of the spring barrel.

9. In a spring device of the character described, a spring barrel, a plurality of sets of friction shoes within the spring barrel, each set comprising a pair of opposed outer shoes extending longitudinally of the axis of the spring barrel and an inner shoe engaging the inner surface of both of the outer shoes of each set, and means urging all of said inner shoes radially outwardly against said outer shoes to cause the outer surfaces of each of the latter to have constant yielding frictional engagement with the inner surface of the spring barrel.

MARSHALL WOODMAN TUFTS,
*Executor of the Estate of George A. Woodman, Deceased.*